(12) United States Patent
Baldwin et al.

(10) Patent No.: US 11,392,435 B2
(45) Date of Patent: Jul. 19, 2022

(54) EVALUATION OF A PERFORMANCE PARAMETER OF A MONITORING SERVICE

(71) Applicant: HEWLETT-PACKARD DEVELOPMENT COMPANY, L.P., Spring, TX (US)

(72) Inventors: Adrian John Baldwin, Bristol (GB); Jonathan Griffin, Bristol (GB); Daniel Cameron Ellam, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,609

(22) PCT Filed: Aug. 22, 2018

(86) PCT No.: PCT/US2018/047558
§ 371 (c)(1),
(2) Date: Oct. 16, 2019

(87) PCT Pub. No.: WO2019/236119
PCT Pub. Date: Dec. 12, 2019

(65) Prior Publication Data
US 2021/0334364 A1   Oct. 28, 2021

(30) Foreign Application Priority Data
Jun. 7, 2018 (WO) ................ PCT/US2018/036522

(51) Int. Cl.
*G06F 11/00* (2006.01)
*G06F 11/07* (2006.01)
*G06F 21/50* (2013.01)

(52) U.S. Cl.
CPC .......... *G06F 11/07* (2013.01); *G06F 11/0748* (2013.01); *G06F 11/0754* (2013.01); *G06F 11/0793* (2013.01); *G06F 21/50* (2013.01)

(58) Field of Classification Search
CPC ............. G06F 11/0748; G06F 11/0754; G06F 11/076; G06F 11/0793; G06F 11/3466; G06F 11/3495; G06F 21/50
See application file for complete search history.

(56) References Cited

U.S. PATENT DOCUMENTS

| 7,363,656 B2 | 4/2008 | Weber et al. |
| 7,523,016 B1 | 4/2009 | Surdulescu et al. |

(Continued)

FOREIGN PATENT DOCUMENTS

WO   WO2017023311 A1   2/2017

OTHER PUBLICATIONS

Ippoliti, Dennis, et al., Online Adaptive Anomaly Detection for Augmented Network Flows, ACM Transactions on Autonomous and Adaptive Systems, vol. 11, No. 3, Article 17, Sep. 2016, 28 pages.

(Continued)

*Primary Examiner* — Marc Duncan
(74) *Attorney, Agent, or Firm* — HP Inc. Patent Department

(57) ABSTRACT

In an example, a method includes analysing data collected from a service. A value representative of the number of anomalies in the data is generated, this value then being compared with a threshold. Depending on whether the value is greater or less than the threshold, a performance parameter of the monitoring service may be evaluated.

19 Claims, 3 Drawing Sheets

(56) References Cited

U.S. PATENT DOCUMENTS

| | | |
|---|---|---|
| 7,610,214 B1 | 10/2009 | Dwarakanath et al. |
| 7,739,082 B2 | 6/2010 | Scherrer |
| 9,699,205 B2 | 7/2017 | Muddu et al. |
| 9,753,796 B2 | 9/2017 | Mahaffey et al. |
| 9,781,148 B2 | 10/2017 | Mahaffey et al. |
| 10,158,658 B1 * | 12/2018 | Sharifi Mehr ...... H04L 63/1425 |
| 2012/0030522 A1 | 2/2012 | Yabuki |
| 2015/0339572 A1 | 11/2015 | Achin et al. |
| 2015/0355901 A1 * | 12/2015 | Bonissone ................ G06F 8/70 |
| | | 717/120 |
| 2017/0063890 A1 | 3/2017 | Muddu et al. |
| 2017/0063898 A1 | 3/2017 | Muddu et al. |
| 2017/0102980 A1 * | 4/2017 | Purushothaman .. G06F 11/0793 |
| 2017/0139762 A1 | 5/2017 | Sherlock et al. |
| 2019/0073253 A1 * | 3/2019 | Sharifi Mehr ...... G06F 11/0709 |
| 2019/0342194 A1 * | 11/2019 | Mermoud .............. G06N 20/20 |

OTHER PUBLICATIONS

Zhang, Zonghua, et al., M-AID: An Adaptive Middleware Built Upon Anomaly Detectors, ACM Transactions on Autonomous and Adaptive Systems, vol. 4, No. 4, Article 24, Nov. 2009, 35 pages.

\* cited by examiner

EVALUATION OF A PERFORMANCE PARAMETER OF A MONITORING SERVICE

BACKGROUND

Computing services may include monitoring services, for example security monitoring services (e.g. anti-virus systems, firewalls and the like) to assist in assuring the security and integrity of a computing system, and activity monitoring services, to monitor activities and actions of a computing system.

BRIEF DESCRIPTION OF DRAWINGS

Examples will now be described, by way of non-limiting example, with reference to the accompanying drawings, in which.

DETAILED DESCRIPTION

Monitoring services, which may be configured as any or any combination of software, hardware and firmware, may monitor computing systems for diverse purposes such as security, forensic services, accounting services, resource allocation and the like. Such services may make records of events such as suspected attacks, patterns of behaviour, unusual activity and the like, and may report such data records as a data output. However, in some examples, it may be that the output of such systems cannot be fully trusted. For example, such services may cease to function correctly, or may be spoofed or hijacked such they are no longer performing their intended function. For example, a service may have a bug/memory leak that has caused something to go wrong, or the service may be attacked (for example by replacing the code, and hence functionality) and be made to perform actions that it should not, in normal function, be performing.

As noted above, such monitoring services may output data, for example in the form of records. In some examples herein, records of events received from such a service may be checked to determine the trustworthiness of the monitoring service and/or any records generated thereby. Anomaly detection may provide statistics relating to whether any data received from a monitoring service is anomalous. In some examples set out below, the output of anomaly detection is analyzed and, based on the analysis, a decision is taken on whether to trust an output from a service. This may mitigate any effects of false positives, i.e. instances a monitoring service may indicate that a computer system is not operating within expected parameter, where this is not the case, and instead it is the output of the monitoring service which should not be trusted (or which is associated with a low level of trustworthiness).

Figure 1:
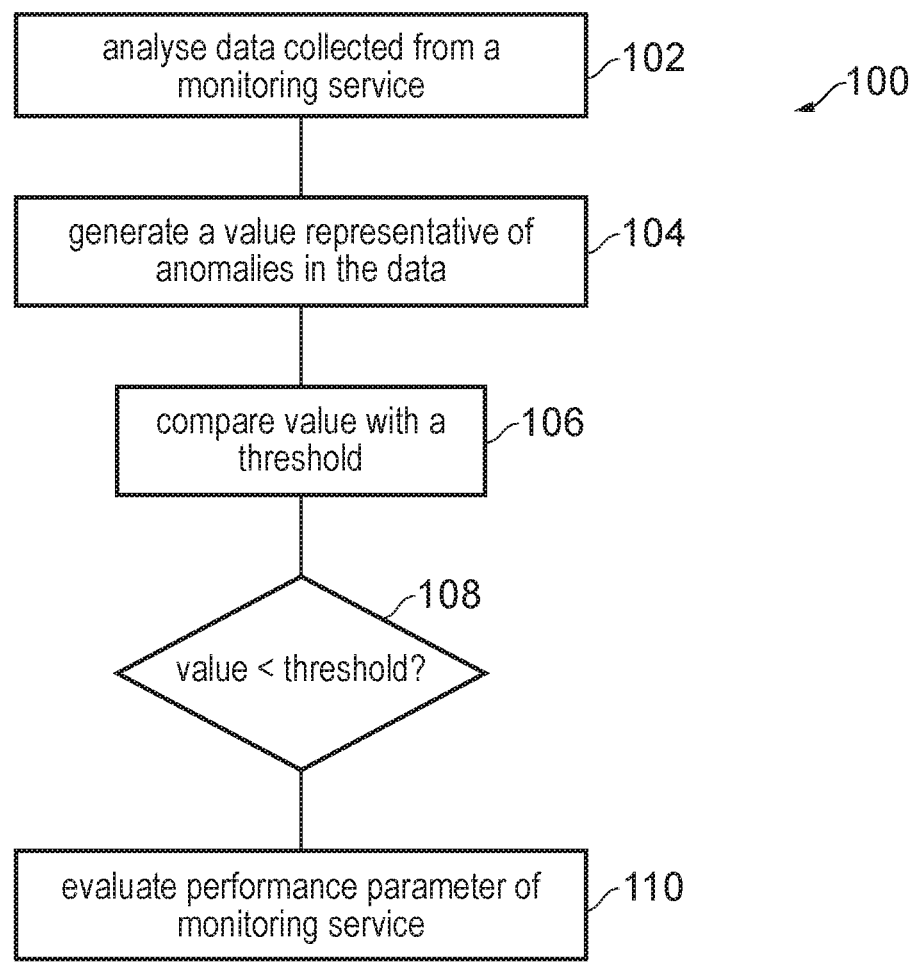
FIG. 1 is a flowchart of an example method.

FIG. 1 is an example of a method 100, which may be a computer implemented method, and may be a method for determining the reliability of a monitoring service of a computing system, or a method for determining if an output of a service is to be trusted. The method 100 may be carried out using at least one processor.

The method 100 comprises, in block 102, analyzing data collected from a monitoring service of a computing system. In one example, this may comprise regularly ingesting or receiving, at at least one processor, records of events from a monitoring service, such as an anti-virus service, a threat detection service, or a resource usage monitoring service. In some examples this may comprise collecting data from a user device (e.g. a client device). In some examples the data may comprise data relating to at least one of: CPU usage, memory usage, resource usage, privileges, network connectivity, a dynamic link library (DLL), or the like. In such examples, such data may be obtained through application programming interfaces (APIs) provided within the operating system.

Collecting data from a service may comprise communicating with the service, for example via an API with authentication, or via a communication link (for example, a named pipe), and/or files stored in a memory which hold data relating to the service may be regularly sampled at intervals. In some examples, such data may be evaluated by an anomaly detection module to decide whether to ingest further data from a monitoring service. In other examples this type of data may be ingested (e.g. accepted as an output) by the monitoring service based on an anomaly assessment.

The method 100 comprises, in block 104, generating a value representative of the number of anomalies in the data. This may be performed by a processor, for example an anomaly detection module or unit. The anomaly detection unit may for example compare the data to parameters, for example ranges within which data may be expected to fall. In some examples, such parameters/ranges may vary over time, for example being based on recently collected data, system states and the like. The anomaly detection unit may, in one example, use an anomaly detection technique. For example, the anomaly detection unit may use a one class support vector machine (SVM) which may have a model trained with normal data for that device or class of device. In another example, a k-nearest neighbour techniques cluster analysis based outlier detection or, in another example, a statistical analysis on the output of a recurrent neural network trained to predict a time series may be used. The value representative of the number of anomalies in the data may comprise the number of anomalies in the collected data. For example a collected data set of 100 datum, comprising 50 datum identified as anomalous, may produce a value of 50 being the number of anomalous data identified in the collected set. In another example, the value may be the proportion of data identified as anomalous, for example 35%. In other examples, the value may comprise multiple values (for example 40 and 65%—the first being representative of the number of anomalous data values and the second value being the proportion of anomalous data).

In other examples, the value may indicate a trend in the anomaly data. For example, data may be collected from a service over a period of time and this data may be analyzed. In one example, the value generated at block 104 may comprise a value representative of how the number of anomalies in the data have changed over time, and/or how the proportion of anomalies in the data change over time. Therefore, in one example, data collected may comprise a stream of data, or multiple streams of data, and analyzing data collected from a service, in block 102, may comprise analyzing multiple streams of data. In such an example, generating a value representing the number of anomalies may comprise generating a value representing the number of anomalies in one stream of data, or a plurality of streams of data. Accordingly, the value may be representative of anomalies present in one, or multiple, data streams.

In one example, multiple values representative of anomalies of a service may be generated. Multiple streams of data may be collected which may therefore give rise to a stream of generated values, with each value being representative of the number of anomalies in the collected data.

In one example, the value may comprise a statistic of the collected data stream.

In an alternate example, a value may be generated for each datum in a data set—for example the value may be representative of the probability that the datum is anomalous. Such a determination may be based, at least in part, on historical data.

Generating a value representative of the number of anomalies may comprise analyzing the data for strange patterns of behaviour, and outputting a value representative of this behaviour.

The method 100 comprises, in block 106, comparing the value with a threshold. The threshold may be a proportion of anomalies in the data, above which a data set, and therefore the service, may be considered compromised. However, in other examples, the reverse may be true. For example, the service may monitor configuration data but, if configuration data is purposefully changed, it may be the presence of a significant amount of anomalies which indicates that the service is performing correctly, rather than an absence thereof.

In block 108, it is determined whether the value is below, or above, the threshold. The method 100 then comprises, in block 110, evaluating a performance parameter of the monitoring service. The evaluation of the performance parameter may result in an output of the service being accepted or rejected. For example, it may be determined at block 108 that the value is above an acceptable threshold, but in block 110 an evaluation may nevertheless result in accepting an output from the service. For example, although the value may be over an acceptable threshold it may be determined that a particular event, with which the value is associated, is high-risk and therefore the threshold was set too high as a failsafe. However, in another example, the output of the service may be rejected if it is above the threshold. In another example, a monitoring service may be expected to generate anomalous results. In such an example, a value below the threshold may indicate that the service is not to be trusted, or not to be fully trusted. In one example the performance parameter may monitor configuration data to assess whether additional anomalies may be expected. For example, if an output of the monitoring service is accepted where the service is running normally then a change to configuration data may indicate that additional anomalies may be expected.

The performance parameter may in one example, may be related to a trust level of the monitoring service.

In one example evaluating the performance parameter may comprise comparing the performance parameter with a threshold.

In one example, the evaluation of a performance parameter of the monitoring service may comprise changing a trust level associated with the monitoring service.

In one example, the value generated in block 104, may comprise a proportion of data, or number of data, that were identified as anomalous. In such an example the threshold may be a maximum proportion of the data, or maximum number of data, that can be identified as anomalous for the service to still be trusted. In another example the value, generated in block 104, may comprise a proportion, or a number of, data identified as anomalous, within a given time period—or an average proportion, or number of, data identifies as anomalous within a given time period.

In this way, how anomalies in the data change over time may be taken into consideration when deciding whether to trust a service. Statistics concerning the data as a whole may therefore be used in deciding whether to trust the service.

Multiple thresholds may be set and an example method comparing a value representative of anomalies in the collected data to multiple thresholds will be described with reference to FIG. 2.

Figure 2:
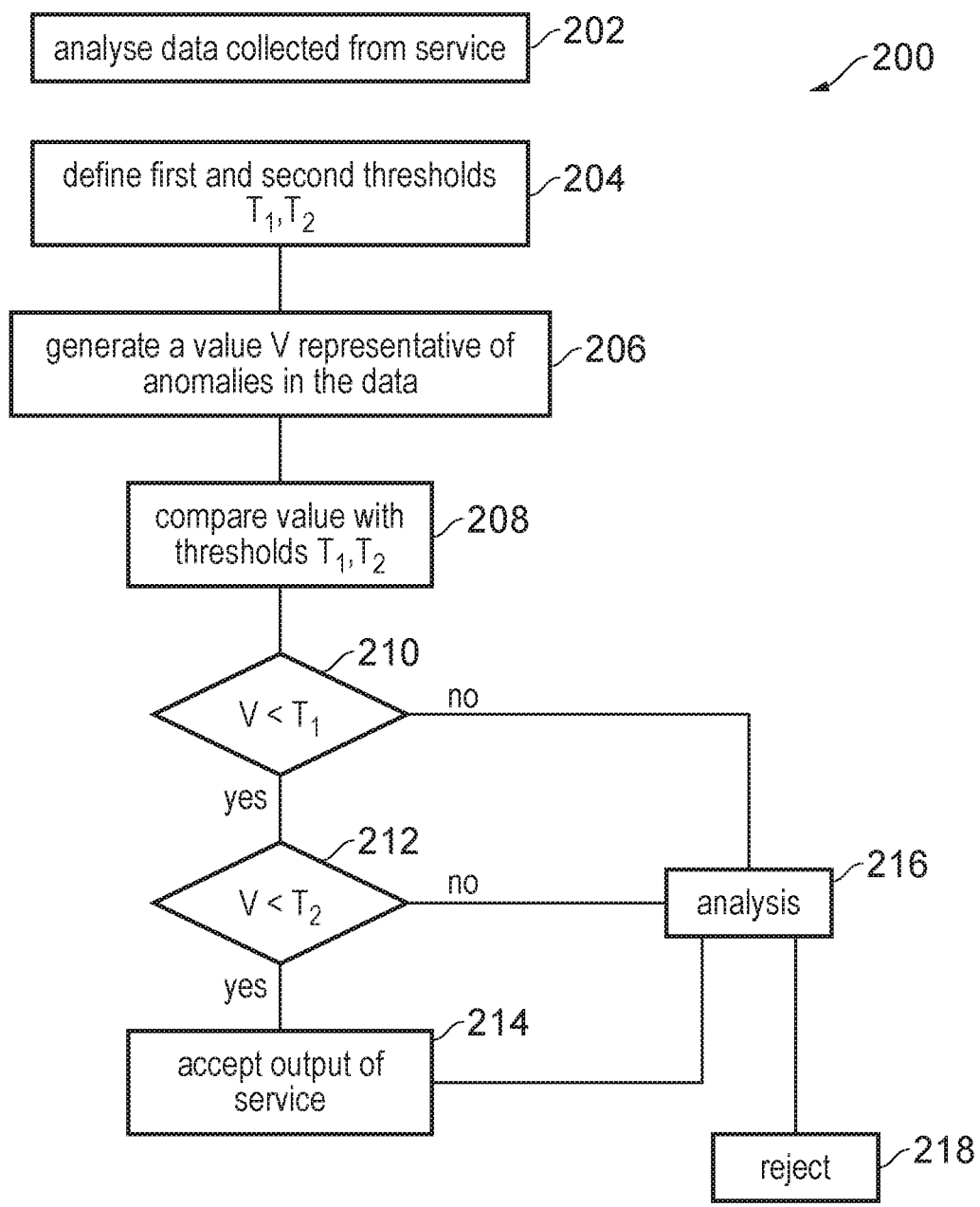
FIG. 2 is a flowchart of an example method.

FIG. 2 is an example of a method 200, which may be a computer implemented method, and may be a method for determining the reliability of a monitoring service, or a method for taking a decision on whether to trust a monitoring service. The method 200 may be carried out using at least one processor.

The method 200 comprises, in block 202, analyzing data collected from a service.

The method 200 comprises, in block 204, defining first and second thresholds T1 and T2. Each threshold may be representative of a statistic relating to anomalies in the data. For example, T1 may be related to the proportion of anomalies in a given data stream over a given time period, and T2 may be related to the rate of change of the number of anomalies in multiple data streams of another given time period, etc. The method 200 therefore allows a secondary comparison to motivate whether to accept an output of the service.

The method 200 comprises, in block 206, generating a value representative of the number of anomalies in the data.

The method 200 comprises, in block 208, comparing the value generated in block 206 with each of the thresholds T1 and T2.

If, at block 210, it is determined that the value is below the first threshold T1 and, at block 212, it is determined that the value is below the second threshold T2, then the method 200 comprises, at block 214, accepting an output of the service.

If, at block 210 is it determined that the value exceeds the first threshold T1 then the method 200 may comprise, at block 216, analyzing at least one of: the collected data, an output from an anomaly detector on the collected data, and the value representing anomalies in the data. In one example, at block 216, the method 200 may comprise checking whether the value exceeds the second threshold T2. A decision may be taken on whether to accept an output from the service based on one of the two thresholds being exceeded. In such an example, the method 200 may comprise performing a further analysis and/or generating statistics relating to at least one of: the collected data, an output form an anomaly detector, and the generated value. In such an example even though one of the thresholds has been exceeded an output of the service may be accepted. Otherwise, after the analysis at block 216, the method 200 comprises, at block 218, rejecting an output of the service. In some examples, a further analysis may be performed by way of the second threshold, in that falling below the second threshold is equivalent to meeting a further analysis criteria. In one example a further analysis may be performed that comprises turning on additional monitoring and analysis. For example, memory forensics may be run on the (potentially) anomalous process, or may search the file/registry access history of the monitoring device. In this way additional data may be used before an output of the service is accepted, where the output may be accepted based on being above, or below, a further threshold.

If, at block 212 it is determined that the value is below the second threshold then, at block 216, the method comprises performing a further analysis, for example analyzing at least one of: the collected data, an output from an anomaly detector on the collected data, and the value representing anomalies in the data. Depending on the outcome of the analysis at block 216 the method 200 may comprise, at bock 214, accepting an output of the service, or, at block 218, rejecting an output from the service.

In one example a value representative of the number of anomalies in the data may be a cumulative value, in that it may represent a number of anomalies in the data over a given time period. Based on comparison with a first threshold, T1, this value may be greater than T1 and therefore too high. In block 216, an analysis of the data and the generated value may result in acceptance of an output of the service at block 214—for example the analysis might reveal that the amount by which the value was over the threshold T1 was in an acceptable margin of error. For example, a higher risk event, or record of an event, that may be transmitted from the service may have a relatively low threshold set due to its higher risk. In such an example there may be an amount by which the generated value may be over the threshold and still be considered acceptable.

The method 200 may, in block 216, comprise evaluating a performance parameter of the monitoring service. This may comprise comparing the performance parameter with a threshold. In another example, one of the first and second thresholds may be associated with a performance parameter of the monitoring service.

In one example where one, or both, thresholds are exceeded the method may comprise performing an analysis. For example, it may be determined that, although the thresholds have been exceeded, generated statistics may indicate that these are false alarms. An additional check may then be performed prior to accepting an output from the service.

In some examples, block 218 may comprise at least one of: restarting the service, running an antivirus (AV) scan, reporting to a management system (e.g. reporting an event or an anomaly), checking for changes in the service that may necessitate a new model (e.g. if the service has been patched), triggering a further corrective operation such as a reimage. Any such action may be dependent on the service and the level of anomaly detection.

In some examples, data is processed remotely form the monitoring service, t, for example being sent to a remote processing device such as a cloud device prior to analysis, e.g. the value and/or threshold(s) may be generated at the remote processing device. Subsequent analysis, and the decision whether to trust the service, may be taken in the remote processing device.

Figure 3:
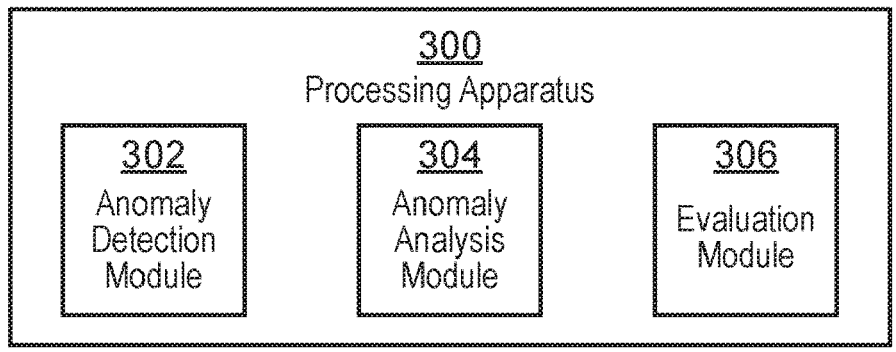
FIG. 3 is an example processing apparatus.

FIG. 3 is an example of a processing apparatus 300. The processing apparatus 300 comprises an anomaly detection module 302, an anomaly analysis module 304, and an evaluation module 306. The anomaly detection module 302 is to detect anomalies in data collected from a monitoring service, which may for example be deployed to monitor a computing system and to produce an output associated with anomalies in the data. The anomaly analysis module 304 is to analyze the output associated with the anomalies in the data and to produce a value representative of the number of anomalies in the data. The evaluation module 306 is to evaluate a performance parameter of the monitoring service. The anomaly detection module 302 may be to collect data from the service at a sample rate, which may be predetermined. For example, the anomaly detection module 302 may be to collect data and to produce a stream of outputs. The anomaly detection module 302 may, in one example, produce a set of outputs, each output in the set may include an output representative of a number of anomalies in the collected data (e.g. collected at different time intervals), a proportion of anomalies in the collected data, a rate of change of anomalies, or an output representative of trends in anomalies in the data.

The processing apparatus 300 of the example of FIG. 3 may perform any of the methods 100 or 200 as set out in FIG. 1 or 2, respectively.

Figure 4:
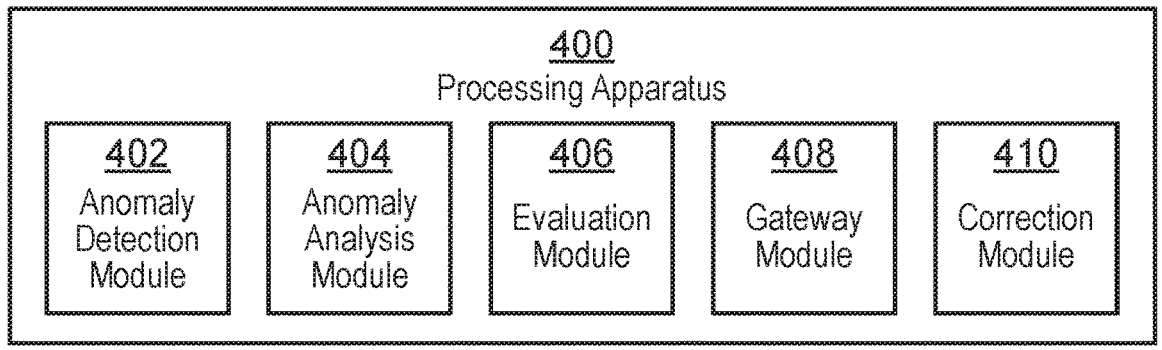
FIG. 4 is an example processing apparatus.

FIG. 4 is an example of a processing apparatus 400. The processing apparatus 400 comprises an anomaly detection module 402, an anomaly analysis module 404, an evaluation module 406, a gateway module 408, and a correction module 410. The anomaly detection module 402 is to detect anomalies in data collected from a service and to produce an output associated with anomalies in the data. The anomaly analysis module 404 is to analyze the output associated with the anomalies in the data and to produce a value representative of the number of anomalies in the data. The evaluation module 406 is to evaluate a performance parameter of a monitoring service. The gateway module 408 in this example is to allow receipt of an output of the service if the value produced by the anomaly analysis module 404 is below a threshold (although in other examples or operational nodes, the gateway module 408 may allow receipt of an output of the service if the value produced by the anomaly analysis module 404 is above a threshold). The correction module 410 is to perform at least one of: restarting the service; running an AV scan, reporting to a management system, checking for changes in the operation of the service, and triggering a corrective operation.

The correction module 410 may be to issue statistics representative of the data or the generated value representative of the anomalies. The correction module 410 may be operatively associated with the evaluation module 406 and/or the gateway module 408, and the gateway module 408 may take the decision to accept, or reject, an output of the service based on information supplied to it from the correction module 410 and/or the evaluation module 406. For example, if it is determined that the value representative of the number of anomalies in the data exceeds the threshold then the evaluation module 406 and/or the correction module 410 may supply information to the gateway module 408 that results in an output of the service being accepted. For example, the threshold may be exceeded but the type of data collected may result in this threshold being set too low. In such an example the correction module 408 may set a second threshold and if the value is below this second threshold then an output of the service may be accepted, even if the first threshold was exceeded.

The processing apparatus 400 of the example of FIG. 4 may perform any of the methods 100 or 200 as set out in FIG. 1 or 2, respectively.

Figure 5:
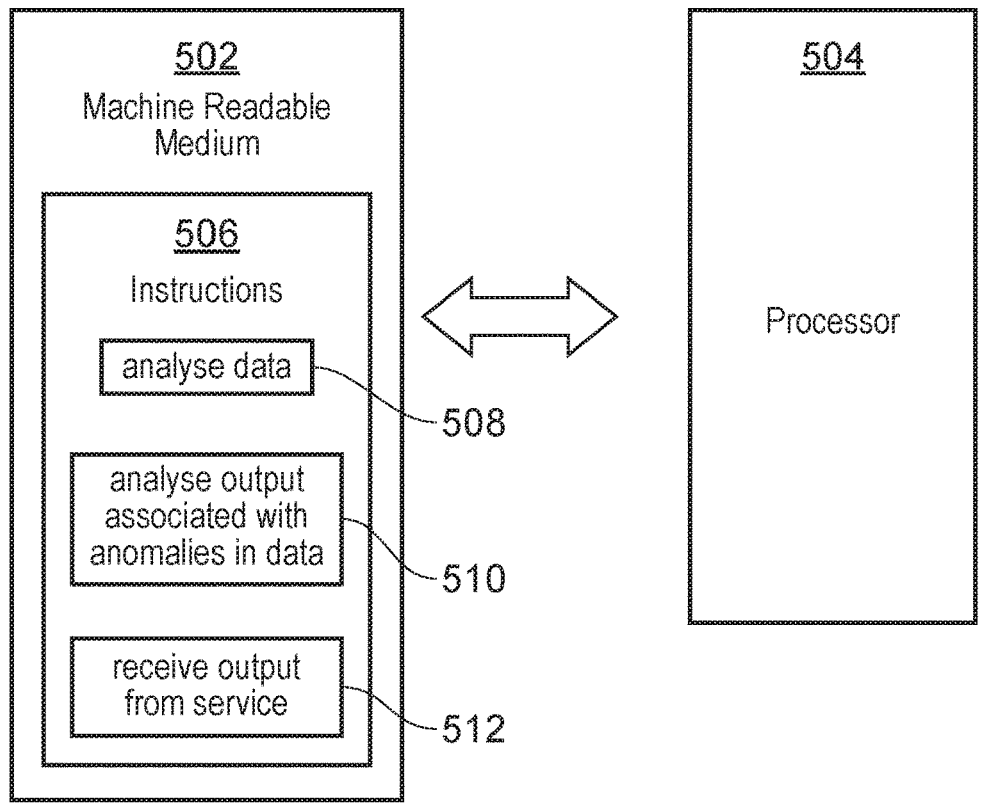
FIG. 5 is an example of a machine readable medium in association with a processor.

FIG. 5 is an example of a tangible (and non-transitory) machine readable medium 502 in association with a processor 504. The tangible machine readable medium 502 comprises instructions 506 which, when executed by the processor 504, cause the processor 504 to carry out a plurality of tasks. The instructions 506 comprise instructions 508 to cause the processor 504 to analyze data collected from a service to produce an output associated with anomalies in the data. The instructions 506 comprise instructions 510 to cause the processor 504 to analyze the output to produce a value representative of the number of anomalies in the data. The instructions 506 comprise instructions 512 to cause the processor 504 to receive an output of the service if this value is below a threshold.

The machine readable medium 502 of the example of FIG. 5 may comprise instructions to perform any, or a combination, of the blocks of methods 100 or 200 as set out in FIGS. 1 and 2, respectively; and/or to provide at least one of the anomaly detection module, anomaly analysis module, gateway module, or correction module of the example processing apparatuses 300 and 400 as set out in FIGS. 3 and 4, respectively.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
analyzing, by a processor, data collected from a threat detection service of a computing system, the threat detection service to detect an attack in the computing system;
generating, by the processor based on the analyzing, a first value representative of a rate of change of a number of anomalies in the data;
comparing, by the processor, the first value to a threshold;
depending on whether the first value is greater or less than the threshold, evaluating, by the processor, a performance parameter of the threat detection service; and
based on the evaluating, the processor causing performance of a corrective action of the threat detection service, the corrective action selected from among restarting the threat detection service or reimaging the threat detection service.

2. The method of claim 1, further comprising accepting or rejecting an output of the threat detection service based on the evaluating.

3. The method of claim 1, wherein the data collected from the threat detection service comprises data relating to at least one of: CPU usage, memory usage, resource usage, privileges, network connectivity, or dynamic link libraries.

4. The method of claim 1, wherein the data is collected from the threat detection service at predetermined time intervals.

5. The method of claim 1, wherein the threat detection service comprises an anti-virus service.

6. The method of claim 1, wherein the threshold is a first threshold, the method further comprising:
generating a second value representative of a proportion of the anomalies in the data; and
comparing the second value to a second threshold,
wherein the evaluating is performed in response to comparing the first value with the first threshold and comparing the second value to the second threshold.

7. The method of claim 6, further comprising:
accepting, by the processor, an output of the threat detection service in response to determining that the first value is less than the first threshold, and the second value is less than the second threshold.

8. The method of claim 1, wherein the threat detection service is executed on a user device, and the method is carried out remotely from the user device.

9. The method of claim 7, wherein the processor causes the performance of the corrective action responsive to the first value exceeding the first threshold, and the second value exceeding the second threshold.

10. The method of claim 1, wherein the first value is representative of how the number of the anomalies has changed over time.

11. A system comprising:
a processor; and a non-transitory storage medium storing instructions executable on the processor to:
  detect anomalies in data collected from a threat detection service of a computing system, and to produce an output associated with the anomalies in the data, the threat detection service to detect an attack in the computing system;
  analyze the output associated with the anomalies, and produce a first value representative of a rate of change of a number of the anomalies in the data;
  compare the first value to a threshold;
  depending on whether the first value is greater or less than the threshold, evaluate a performance parameter of the threat detection service; and
  based on the evaluating, cause performance of a corrective action of the threat detection service, the corrective action selected from among restarting the threat detection service or reimaging the threat detection service.

12. The system of claim 11, wherein the instructions are executable on the processor to accept or reject an output of the threat detection service based on the evaluating.

13. The system of claim 11, wherein the threshold is a first threshold, and the instructions are executable on the processor to:
  generate a second value representative of a proportion of the anomalies in the data; and
  compare the second value to a second threshold,
  wherein the evaluating is performed in response to comparing the first value with the first threshold and comparing the second value to the second threshold.

14. The system of claim 13, wherein the instructions are executable on the processor to:
  accept an output of the threat detection service in response to determining that the first value is less than the first threshold, and the second value is less than the second threshold.

15. The system of claim 14, wherein the instructions are executable on the processor to:
  cause the performance of the corrective action responsive to the first value exceeding the first threshold, and the second value exceeding the second threshold.

16. The system of claim 11, wherein the threat detection service comprises an anti-virus service.

17. The system of claim 11, wherein the first value is representative of how the number of the anomalies has changed over time.

18. A non-transitory machine-readable storage medium comprising instructions that upon execution cause a system to:
  analyze data collected from a threat detection service of a computing system to produce an output associated with anomalies in the data, the threat detection service to detect an attack in the computing system;
  analyze the output to produce a first value representative of a rate of change of a number of the anomalies in the data;
  compare the first value to a threshold;
  depending on whether the first value is greater or less than the threshold, evaluate a performance parameter of the threat detection service; and
  based on the evaluating, cause performance of a corrective action of the threat detection service, the corrective action selected from among restarting the threat detection service or reimaging the threat detection service.

19. The non-transitory machine-readable storage medium of claim 18, wherein the threshold is a first threshold, and the instructions upon execution cause the system to:
  generate a second value representative of a proportion of the anomalies in the data; and
  compare the second value to a second threshold,
  wherein the evaluating is performed in response to comparing the first value with the first threshold and comparing the second value to the second threshold.

* * * * *